Patented Jan. 29, 1929.

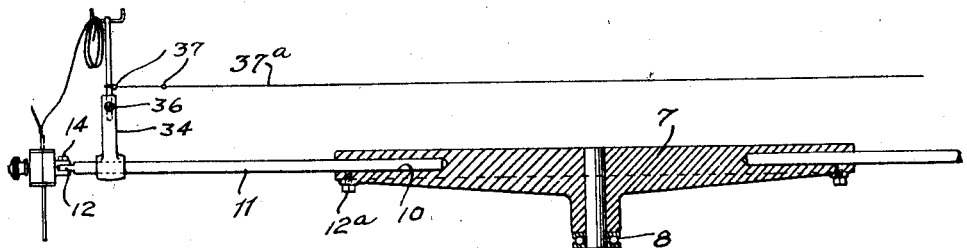
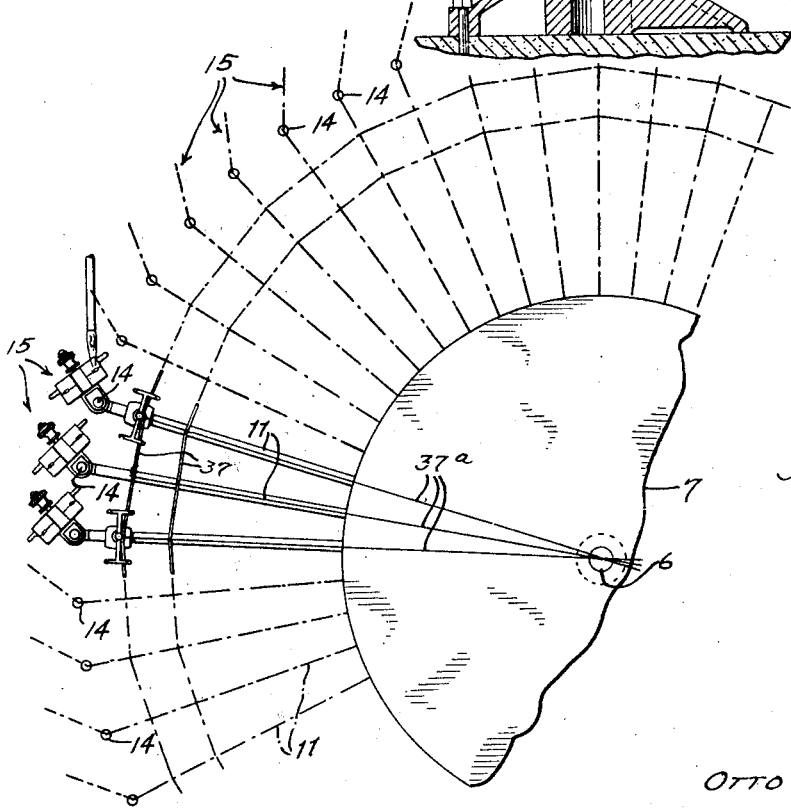

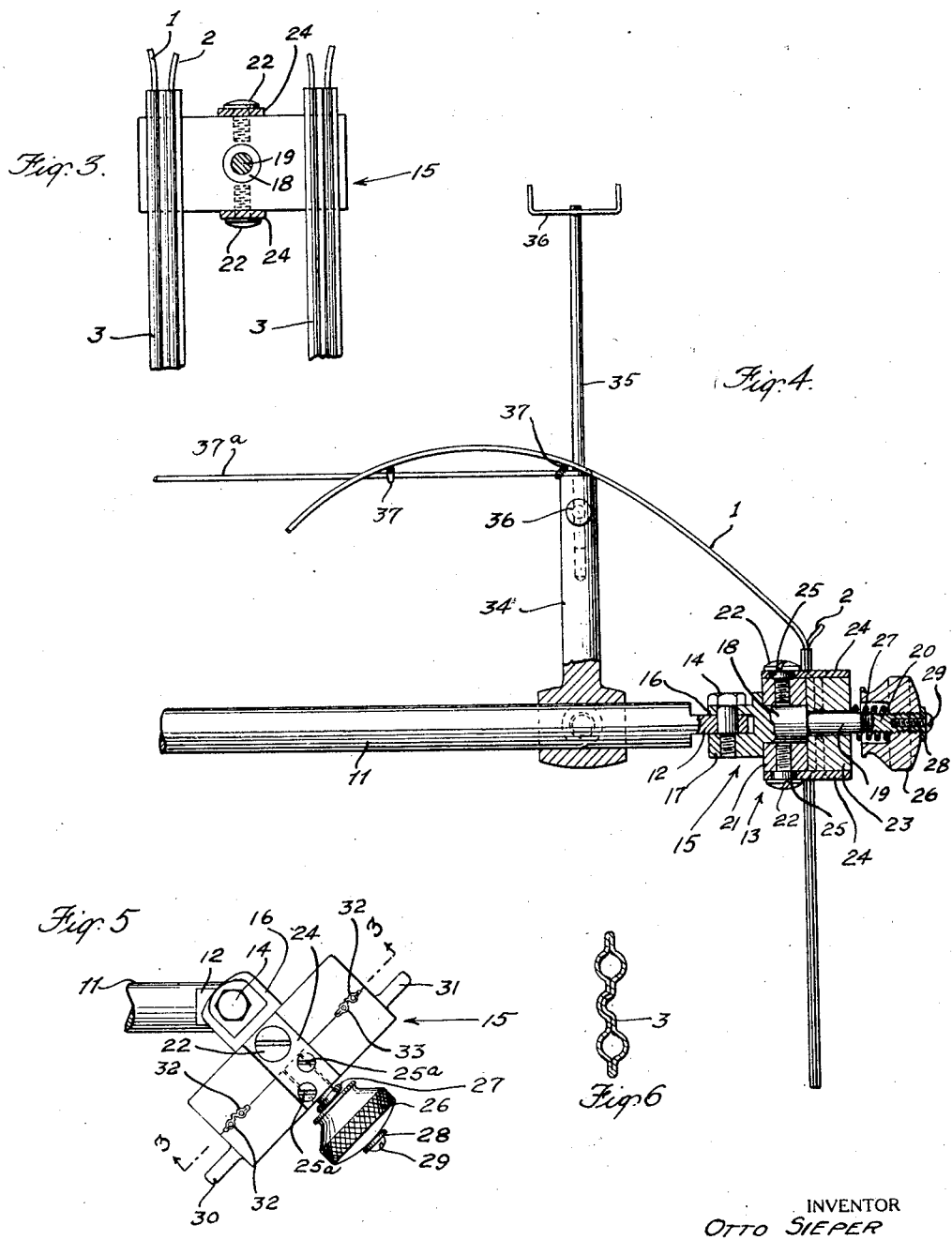

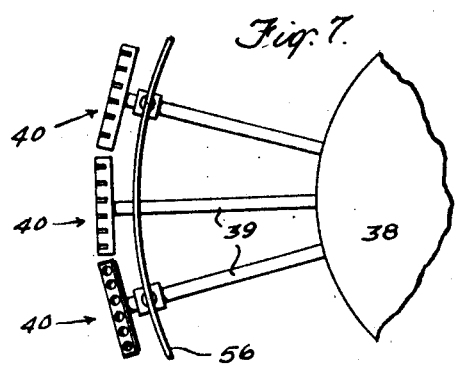
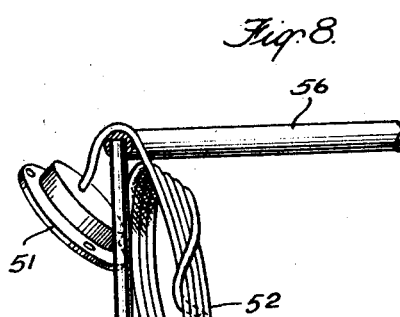
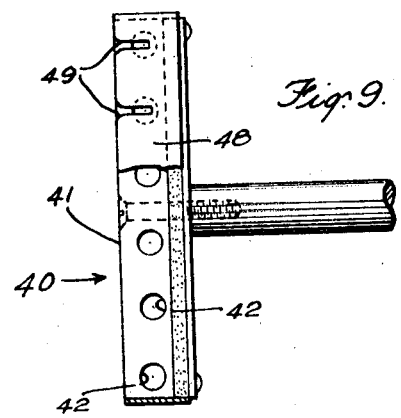
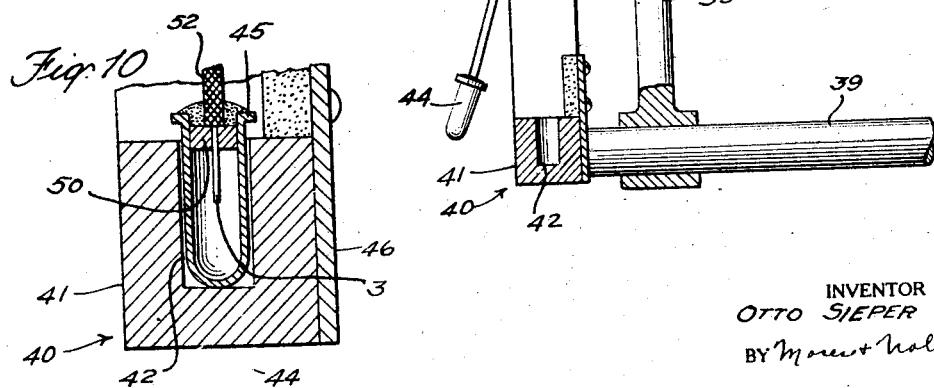

1,700,242

UNITED STATES PATENT OFFICE.

OTTO SIEPER, OF RICHMOND HILL, NEW YORK, ASSIGNOR TO THE MOTO METER COMPANY, INC., OF LONG ISLAND CITY, NEW YORK, A CORPORATION OF NEW YORK.

MANUFACTURE OF INDICATING INSTRUMENTS.

Application filed February 2, 1927. Serial No. 165,299.

This invention has to do with soldering or brazing, and particularly with controlling the temperature of the body or bodies being worked on, where desirable properties of such bodies would be likely to be injuriously affected or destroyed by the usual soldering or brazing temperature.

The present invention is in the nature of an improvement upon my pending application Serial No. 165,300 for indicating instruments and the manufacture thereof, filed February 2, 1927.

In said pending application disclosure is made of a method of brazing which consists in clamping a work piece, such as a Bourdon coil, between heat conducting and absorbing jaws having a sufficient heat absorbing or dissipating capacity to confine such heating of the work piece as would affect the desired properties of the work piece to a predetermined part thereof in the immediate vicinity of the brazing. In the illustrative embodiment of said application the clamping jaws were provided with a water circulatory system, and the heat dissipating capacity was thereby made so great that the work holder formed by the jaws could be used uninterruptedly.

In accordance with the present invention, the circulatory cooling system of the work holder is dispensed with, the mass of the metal forming the jaws being relied upon to absorb the heat and prevent injury to the work piece. It is a feature of the invention that a multiplicity of work holders is provided, and that these work holders are arranged for use in rotation so that each work holder, when used, will be allowed ample time to cool during the period in which the other work holders of the series are being used.

A further object of the invention is to provide for orderly and convenient handling and presentation to the workmen, of the Bourdon tubes and the somewhat awkward, long, flexible transmission tubes used in distance type instruments, in assembled relation.

Other objects and advantages will hereinafter appear.

In the drawings forming part of this specification:

Figure 1 is a vertical section of a preferred embodiment of the mechanism of the present invention;

Figure 2 is a fragmentary plan view of such mechanism;

Figure 3 is a detail, sectional view on the line 3—3 of Figure 5;

Figure 4 is a detail, sectional elevation of one of the work holders and certain associated parts on a larger scale than Figures 1 and 2;

Figure 5 is a plan view of one of the work holders;

Figure 6 is an end view of a Bourdon tube for which the work holder is designed;

Figure 7 is a fragmentary plan view of a modified form of the apparatus designed for use in brazing the thermometer bulbs and capillary tubes of distance type thermometers together;

Figure 8 is a sectional elevation of one of the work holders disclosed in Figure 7 on a larger scale than Figure 7;

Figure 9 is a plan view, partly broken away, of one of the work holders of Figure 7; and Figure 10 is a sectional elevation on a larger scale than the other figures, showing a holder with a thermometer bulb therein and the parts to be united with the thermometer bulb.

The illustrative apparatus of Figures 1 to 5 is designed for use in brazing the pressure transmitting tube 1 and filling tube 2 of a distance type, pressure operated instrument to a Bourdon tube 3 thereof (see particularly Figures 3, 4 and 6). As pointed out in my application above referred to, it is highly desirable to effect the connection of these elements by brazing because of the greater strength and permanency which may be procured by the use of hard solder and for other reasons. As also pointed out, however, the use of hard solder introduces a difficulty because of the high temperature which is involved in its use. It is essential where hard solder is used that the excessive heat be dissipated and prevented from spreading to the flexible portion of the Bourdon tube and affecting the resiliency or stiffness thereof. One feature of the present invention has to do with the provision of an apparatus for thus controlling and dissipating the brazing of heat.

Provision is made of a pedestal 4 which adjustably supports a hollow column 5 that carries a vertically extending bearing member 6. A table 7 is rotatably mounted upon the upper end of the bearing member 6 and is supported upon a ball bearing 8 interposed between the hub of said table and a collar 9 on the bearing member 6. The table 7 is provided with a multiplicity of radially extending sockets 10 in which radial arms 11 are supported. Binding nuts 12ᵃ are threaded through the table 7 to hold the arms 11 adjustably in the sockets 10. Each arm 11 has an ear 12 at its outer end (see particularly Figure 4) on which a work holder 13 is mounted by means of a pivot screw 14 with capacity for adjustment about a vertical axis. The work holder comprises a carrier member 15 having upper and lower ears 16 and 17 which embrace the ear 12 of the arm 11 and having engagement with the screw 14. The screw 14 is threaded into the lower ear 17, and when drawn tight, binds the ears 16 and 17 upon the ear 12, so that the work holder may be fixed in position. The carrier member 15 also comprises an arm having a portion 18 of large diameter, a portion 19 of smaller diameter, and an outer end 20 which is externally threaded. A stationary jaw 21 is supported upon the large portion 18 of the carrier arm and is fixed thereto by upper and lower shouldered binding screws 22. A second jaw 23 is supported by means of upper and lower plates 24 which overlie and engage the upper and lower surfaces of the fixed jaw 21 and loosely surround the binding screws 22. The openings 25 through the plates 24 are large enough with reference to the size of the screws 22 to permit movement of the jaw 23 with the plates toward and from the fixed jaw 21. The plates 24 are fixed to the jaw 23 by screws 25ᵃ. The reduced portion 19 of the carrier 15 extends loosely through the movable jaw 23. A thumb nut 26 is threaded on the outer end 20 of the carrier arm and is provided with a recess in which a coil compression spring 27 is seated for engaging the movable jaw 23 and urging it toward the fixed jaw 21. The desired clamping pressure effected by this spring may be adjusted by turning the thumb nut 26. A stop plate 28 is secured upon the end of the threaded portion 20 of the carrier arm by means of a screw 29 and serves to limit retraction of the nut 26 so that said nut cannot be accidentally backed off the carrier arm.

The movable jaw 23 is provided at its opposite ends with handles 30 and 31 by which it may be moved against the force of the spring 27 to separate the jaws and enable a Bourdon tube to be inserted between them. The jaws described are designed to hold two Bourdon tubes, one at each end, and for this purpose are provided at each end with complementary recesses 32 and 33 designed to snugly fit a Bourdon tube when the jaws are brought together. When it is desired to insert a Bourdon tube between the jaws, one of the handles, as 30, is pulled outward, and this causes the movable jaw to rock about the end thereof remote from the handle 30. When the handle 30 is released, the movable jaw is returned to gripping engagement with the fixed jaw by the spring 27. Similarly the insertion of a Bourdon tube in the recesses at the opposite end of the clamp may be effective by operation of the handle 31. This causes the movable jaw to rock about the end thereof remote from the handle 31 and does not result in releasing the Bourdon tube already held in place at such remote end.

When the Bourdon tubes have been put in place in the holders with their upper ends projecting a short distance above the holders, the filling tubes 2 and the pressure transmitting tubes 3 are set in place in the ends of the capillary tubes.

The pressure transmitting tubes 3 are long and are coiled for convenient handling at this stage of the manufacture of the instruments. Provision is made of means for supporting the looped portions of these tubes during the brazing operation. To this end each of the arms 11 carries a standard 34 at its outer end in which an upright rod 35 is held by a set screw 36 with capacity for vertical adjustment. Each rod 35 carries at its upper end a cross member 36, which has its ends upturned and serves as a hooked support upon which the looped tubes may be hung. The upright rods 35 may be braced and tied together by brace wires 37.

In the use of the apparatus Bourdon tubes are first placed in all of the holders in the manner described, and the capillary tubes 2 and pressure transmitting tubes 3 are inserted in the protruding upper ends of the Bourdon tubes. A suitable flux is then applied to the assembled tubes at the point where the brazing is to be effected, the flux being applied in rotation to the tubes so that it will have ample time to dry in each instance before any brazing is begun. The brazing is then effected, preferably by two workmen standing at opposite sides of the apparatus. One of the workmen brazes all of the tubes at the outer ends of the work holders and the other brazes all of the tubes at the inner ends of the work holders, each workman thus confining his efforts to similarly positioned tubes so that his motions are always the same. The angular mounting of the work holders is designed to provide easy access to the inner sides of the tubes and may be changed, if desired, by the workmen, to procure the most convenient arrangement.

Each work holder is of such length and mass that the brazing of one of the tubes held by it does not result in a very substantial heating of the remote end of the work holder. Since the workmen operate at opposite sides of the table, however, a substantial cooling interval is allowed between successive operations involving any given holder, and overheating is definitely prevented.

When all of the tubes have been brazed, they are removed in rotation from the work holders and the operation is repeated, the holders being used in the same order as before.

In Figures 7 to 10 disclosure is made of an apparatus similar to that already described but designed for use in brazing flexible pressure transmitting tubes to thermometer bulbs. In this operation the dissipation of heat is less important than in the operation already described, so that the holders may be more closely packed.

A table 38, which is similar in construction and mounting to the table 7 already described, carries radially adjustable arms 39 on which holders 40 are fixed. Each holder comprises a metal block 41 having a plurality of bores 42 therein forming pockets for supporting thermometer bulbs 44. Each holder comprises a back plate 46 which supports a bail 47, the upper horizontal web 48 of which is formed as a comb with tapering slots 49 extending inward at intervals along one of its edges. These slots are of such width that the armored pressure transmitting tubing 3 may be pressed into them and gripped in place to prevent any tendency for the lower ends of the tubes, when placed in the mouth of the bulbs 44, to be displaced.

The armor braid is removed from the lower end of the pressure tube 3 and the lower end of said tube is inserted through a central hole in a metallic plug 50 which fits the mouth of the thermometer bulb 44. The plug 50 is brazed to the tube 3 and to the bulb 44 at a single operation.

Provision is additionally made of means for holding the mechanism head 51 of the instrument and the looped portion 52 of the pressure transmitting tubing out of the way but conveniently at hand during brazing. Certain of the arms 39 are provided with upright standards 53 having sockets in their upper ends in which upright rods 54 are adjustably held by set screws 55. The rods 54 support at their upper ends a ring 56 on which the instrument heads 51 and the tubing loops 52 are hung. The instrument head is hung at the opposite side of the ring 56 from the loop so that the loop is effective by engagement with the ring to overcome any tendency of the instrument head to pull the lower end of the tubing away from the holder 40.

In using this form of the invention the several bulbs positioned in the pockets of a holder may be brazed one after another. If it is found, however, that this results in objectionable heating of the holder, the operator may braze alternate bulbs, or every third bulb, or only one bulb in each holder, making as many revolutions of the wheel as necessary to braze all the bulbs in all the holders. Other schemes for dealing with the bulbs in an orderly manner may be adopted to provide the desired cooling interval, the division of the bulbs into groups by the several holders and the arrangement for bringing up the holders in rotation making it easy to carry out such a plan.

While I have illustrated and described in detail certain preferred forms of my invention, it is to be understood that changes may be made therein and the invention embodied in other structures. I do not, therefore, desire to limit myself to the specific constructions illustrated, but intend to cover my invention broadly in whatever form its principle may be utilized.

I claim:

1. In a brazing apparatus, an article holder comprising fixed and movable jaws, said holder being designed to hold a plurality of articles, one at each end of the jaws, the movable jaw of the holder being rockable about either of its ends, spring means urging the movable jaw toward the fixed jaw, and handles at opposite ends of the movable jaw, each adapted to open the jaws at the end at which it is mounted, without releasing an article held by the jaws at the opposite end thereof.

2. In a brazing apparatus, an article holder comprising fixed and movable jaws, said holder being designed to hold a plurality of articles, one at each end of the jaws, the movable jaw of the holder being rockable about either of its ends, spring means urging the movable jaw toward the fixed jaw, handles at opposite ends of the movable jaw, each adapted to open the jaws at the end at which it is mounted, without releasing an article held by the jaws at the opposite end thereof, and means for adjusting the spring means to change the force exerted thereby upon the movable jaw.

3. In a brazing apparatus, an article holder comprising a fixed jaw, a second jaw supported between its ends upon the fixed jaw, but movable toward and from the fixed jaw and rockable relatively thereto, a spring engaging the movable jaw between its ends and urging it toward the fixed jaw, and handles at opposite ends of the movable jaw, the jaws being unconnected at their ends so that articles may be inserted between them without obstruction.

4. In a soldering apparatus for uniting a thermometer bulb to a pressure transmitting tube, in combination, a bulb holder, a guide thereabove for the end of the flexible tube adjacent the bulb holder, and a hanger upon which the main length of the tube may be swung in looped form.

5. In a soldering apparatus for uniting thermometer bulbs with flexible, pressure transmitting tubes, in combination, a bulb holder having a multiplicity of pockets for receiving bulbs, a guide comb fixed above the bulb holder for supporting the ends of the pressure transmitting tubes adjacent the holder pockets, and supporting means on which the main length of the tubes may be hung in looped form.

6. In combination, a thermometer bulb holder, and means for holding a distance type instrument mechanism and attached pressure transmitting tube during soldering of an end of the tube to a thermometer bulb, comprising a hanger on which the instrument head and the wire in looped form may be swung, and a plate above the bulb holder having a slot therein in which the tube may be pressed and gripped.

7. In a soldering apparatus for uniting thermometer bulbs with pressure transmitting tubes, in combination, a rotary table, a series of bulb holders mounted peripherally on said table, guides mounted on the table directly above the bulb holders for guiding and holding the ends of the flexible tubes adjacent the respective bulb holders, and hanger means upon the table on which the main lengths of the tubes may be hung in looped form.

8. The method of brazing articles, which comprises providing a multiplicity of article holders, each having a sufficient heat absorbing capacity to prevent injury to the desired properties of the articles, inserting articles in the holders in extensive and intimate engagement therewith and using said holders in rotation for holding articles during brazing, the number of holders being large enough so that each holder is allowed ample time to cool between uses.

9. The method of brazing articles, which comprises providing a multiplicity of article holders, each having sufficient heat absorbing capacity to prevent injury to the desired properties of the articles held thereby, inserting articles in the holders in extensive and intimate engagement therewith and using said holders in rotation for holding articles during brazing whereby an interval sufficient for effecting a predetermined number of brazing operations is allowed between successive uses of each holder to assure each holder an ample cooling interval between uses.

10. The method of brazing articles, which comprises mounting a multiplicity of articles in a multiplicity of heat absorbing holders in extensive and intimate engagement therewith, each holder having a sufficient heat absorbing capacity to prevent injury to the desired properties of the article held, feeding said holders past a brazing station, successively brazing the articles as they arrive at said station, removing the brazed articles from the holders, again placing articles in the holders, and again feeding the holders past the brazing station in the same order as before, while brazing the articles as they arrive at said station.

In testimony whereof I have affixed my signature to this specification.

OTTO SIEPER.